(12) United States Patent
Berg

(10) Patent No.: US 11,821,784 B2
(45) Date of Patent: Nov. 21, 2023

(54) FIBRE-OPTIC HYDROPHONE WITH INTERNAL FILTER

(71) Applicant: Alcatel Submarine Networks, Nozay (FR)

(72) Inventor: Arne Berg, Kattem (NO)

(73) Assignee: Alcatel Submarine Networks, Nozay (FR)

( * ) Notice: Subject to any disclaimer, the term of this patent is extended or adjusted under 35 U.S.C. 154(b) by 152 days.

(21) Appl. No.: 17/226,270

(22) Filed: Apr. 9, 2021

(65) Prior Publication Data

US 2021/0325236 A1 Oct. 21, 2021

(30) Foreign Application Priority Data

Apr. 17, 2020 (EP) .................................... 20315191

(51) Int. Cl.
*G01H 9/00* (2006.01)
(52) U.S. Cl.
CPC .................................... *G01H 9/004* (2013.01)
(58) Field of Classification Search
CPC .......... G01V 1/04; G01V 1/143; G01V 1/155; G01V 1/38; G01V 1/02
See application file for complete search history.

(56) References Cited

U.S. PATENT DOCUMENTS 3,831,137 A * 8/1974 Cuomo ................... G01V 1/186
367/141
4,525,818 A * 6/1985 Cielo ................... G02B 6/4457
367/149

(Continued)

FOREIGN PATENT DOCUMENTS

WO    WO 2013/175010 A2    11/2013

OTHER PUBLICATIONS

EP Office Action mailed in corresponding EP Application No. 20 315 191.5 dated Nov. 24, 2022, 6 pages.

(Continued)

*Primary Examiner* — Daniel L Murphy
*Assistant Examiner* — Amie M Ndure
(74) *Attorney, Agent, or Firm* — Tong, Rea, Bentley & Kim, LLC

(57) ABSTRACT

A fibre-optic hydrophone comprising a substantially incompressible tubular body, the tubular body generally having a geometry of a cylindrical shell defining an axis, and a deflectable outer wall, arranged to surround the tubular body in a distance thereof, and defining an axis that is arranged to substantially coincide with the axis of the tubular body. The hydrophone further comprising an optical fibre coil arranged on an outer surface of the outer wall, and a first and a second end lid arranged to seal the tubular body and the outer wall at a first end and a second end thereof, respectively, the first end lid and the second end lid being substantially incompressible. Additionally, the hydrophone comprising an outer cavity defined by an inner surface of the outer wall, an outer surface of the tubular body, the first lid, and the second lid; and an inner cavity defined by an inner surface of the tubular body, the first lid, and the second lid. The outer cavity is in fluid communication with the inner cavity via one or more passages in the tubular body, the outer cavity and the inner cavity being filled with a fluid, wherein the passages are configured to contribute to a function as a filter defining a low pass filter response with high cut-off frequency. In some embodiments the deflectable outer wall is cylindrical.

21 Claims, 4 Drawing Sheets

(56) References Cited

U.S. PATENT DOCUMENTS

| | | | | | |
|---|---|---|---|---|---|
| 5,363,342 | A | * | 11/1994 | Layton | H04R 23/00 356/477 |
| 5,394,377 | A | * | 2/1995 | vonBieren | G01H 9/004 250/227.27 |
| 6,288,975 | B1 | * | 9/2001 | Frederick | G01V 1/186 181/102 |
| 6,549,488 | B2 | | 4/2003 | Maas et al. | |
| 6,882,595 | B2 | | 4/2005 | Woo | |
| 7,295,493 | B1 | | 11/2007 | Ames | |
| 8,069,913 | B2 | * | 12/2011 | Coste | G01V 1/52 166/250.11 |
| 9,069,099 | B2 | * | 6/2015 | Auzerais | G01V 1/40 |
| 9,085,962 | B2 | * | 7/2015 | Richards | E21B 43/10 |
| 9,103,713 | B2 | | 8/2015 | Launay et al. | |
| 2004/0184352 | A1 | * | 9/2004 | Woo | H04R 1/44 367/149 |
| 2004/0202401 | A1 | * | 10/2004 | Berg | G01V 11/00 385/12 |
| 2005/0195687 | A1 | * | 9/2005 | Woo | H04R 1/44 367/149 |
| 2007/0189658 | A1 | * | 8/2007 | Maas | G01P 15/18 385/5 |
| 2009/0242205 | A1 | * | 10/2009 | Coste | G01V 1/46 166/308.1 |
| 2011/0188348 | A1 | * | 8/2011 | Auzerais | G01V 1/40 367/86 |
| 2015/0219776 | A1 | * | 8/2015 | Fernihough | G01V 1/186 367/149 |

OTHER PUBLICATIONS

Wang, Z., et al., "A fiber-optic hydrophone with an acoustic filter," Proceedings of SPIE—The International Society of Optical Engineering, Nov. 2007, 6 pages.

EP Summons to Attend Oral Proceedings Pursuant to Rule 115(1) EPC mailed in counterpart EP Application No. 20315191.5 on May 9, 2023, 7 pages.

* cited by examiner

FIBRE-OPTIC HYDROPHONE WITH INTERNAL FILTER

CROSS-REFERENCE TO RELATED APPLICATIONS

This application is based on and claims the benefit of European Patent Application No. 20315191.5, filed on Apr. 17, 2020, which is hereby incorporated herein by reference in its entirety.

FIELD OF THE INVENTION

The present invention relates to a fibre-optic hydrophone with an internal filter to define the bandwidth of the hydrophone.

BACKGROUND

Fibre-optic sensors can eliminate the need for electric power and components in sensor stations. This has a potential for high reliability and long lifetime in subsea application. The interrogation system can be located onshore or on a vessel with simple access for maintenance and repair.

A hydrophone typically involves the following elements: a hydrophone sensing element for generating a signal when subject to pressure changes connected to means for acquiring or transmitting the signal, including a support structure for holding these and optionally shielding for protection of the hydrophone sensing element.

FIG. 1 is a schematic illustration of a hydrophone sensing element, which is a fibre-optic air-backed mandrel hydrophone 1. The structure 2 is a sealed hollow cylinder around which an optic fibre 3 is coiled. The sensitive part of the hydrophone sensing element is in this example the surface part 4 which is typically cylindrical. The mandrel has an inner sealed cavity 6 filled with air or gas to make the sensitive element air-backed. Fibre ends 5 provide the means for transmitting the generated signal.

Typical hydrophones are designed to operate in liquid, such as in seabed waters, and are intended to exhibit high sensitivity of the optical demodulation in response to a small compressions caused on the hydrophone body. In practical use, such hydrophones are shielded or encapsulated for protecting the sensing elements during handling, but care is taken to maintain their sensitivity and dynamic range.

WO 2013 175010 A2 discloses a hydrophone housing. The housing comprises an outer casing with an exterior shape being in close contact with sediment when buried therein and having a deflectable wall part. Solid material partly fill the casing to define an outer chamber behind the deflectable wall part, a cavity shaped so that an inner chamber is defined immediately surrounding a hydrophone sensing element held therein, and a first duct for liquid connection between the outer chamber and the cavity or an internal volume of the hydrophone sensing element. Thereby, a hydraulic coupling is provided so that an acoustic pressure causing small radial displacements of outer surface of the housing will, via liquid in the first duct, cause radial displacements of the hydrophone sensitive element. The area of the deflectable wall part is comparatively much larger than the area of the sensitive element so that only small displacements of the housing are required to cause comparatively larger displacements at the hydrophone sensing element. It is to be noted that the stiffness of the outer wall material (e.g. metal) reduces the overall sensitivity compared to a hydrophone directly exposed to the water.

The first duct may optionally be dimensioned to act as a mechanical, acoustic low-pass filter in the form of a Helmholtz tube or filter. The disclosed hydrophone sensing element/hydrophone house system is optimized for being buried in the sea floor. To withstand the installation process, the hydrophone house is made relatively large and heavy.

Hence, a more compact hydrophone for use in water would be advantageous.

SUMMARY

It is desired to provide a compact fibre-optic hydrophone with high sensitivity, for use either suspended in water, or on or above the seafloor surrounded by water. It is also desired to integrate a low-pass filter with high cut-off frequencies to reduce the noise bandwidth of the measured acoustic signal. In particular, it is desirable to provide a fibre-optic hydrophone with a compact form factor, having a high sensitivity and capable of providing frequency cut-off characteristics at frequencies at or above 2 kHz.

Thus, according to a first aspect there is provided a fibre-optic hydrophone comprising a substantially stiff and incompressible tubular body, the tubular body generally having a geometry of a cylindrical shell. A deflectable outer wall is arranged to surround the tubular body at a distance thereof, defining an axis that is arranged to substantially coincide with the axis of the tubular body. The hydrophone further comprises an optical fibre coil arranged on an outer surface of the outer cylinder wall, and a first and a second end lid arranged to seal the tubular body and the outer wall at a first end and a second end thereof, respectively, the first end lid and the second end lid being substantially incompressible. With this structure, the hydrophone comprises an outer cavity defined by an inner surface of the outer wall, an outer surface of the tubular body, the first lid, and the second lid; and an inner cavity defined by an inner surface of the tubular body, the first lid, and the second lid. The outer cavity is in fluid communication with the inner cavity via one or more passages in the tubular body, the outer cavity and the inner cavity being filled with a fluid, wherein the one or more passages are configured to contribute to a function as a filter defining a frequency response.

In this way, a hydrophone with a high sensitivity may be achieved, since the hydrophone mandrel is directly exposed to the surrounding water, without the need of being installed inside a housing.

In some embodiments the deflectable outer wall may be in the form of a cylinder. In an embodiment of the fibre-optic hydrophone, the passages have length and a cross-sectional shape, wherein the length and cross-sectional shape are selected to provide a chosen frequency response.

In an embodiment of the invention, the passages are formed as holes with a substantially circular cross-section through the tubular body. In this way, manufacturing of the tubular body may be simplified, as the passages may be formed by e.g. drilling.

In an embodiment of the invention, the tubular body comprises a plurality of passages. In this way, the frequency response may be finely controlled or tailored to the specific application by adjusting the position, length and/or cross-sectional shape of each of the plurality of passages. The distribution of passages over the tubular body makes it feasible to achieve higher cut-off frequencies than possible with one or a few passages due to the required speed and flow distribution of the fluid, e.g. oil, for proper pressure distribution.

In an embodiment of the invention, each of the plurality of passages are configured to have substantially identical cross-sectional shapes.

In an embodiment of the invention, one or more of the plurality of passages are configured to have a different cross-sectional shape, compared to the other passages. In this way, the combined frequency response of the system may be tailored by staggering different frequency response components from individual passages.

In an embodiment, the plurality of passages are substantially uniformly positioned around the tubular body. The flow of oil between the outer cavity and the inner cavity is restricted by the viscosity of the oil. By providing multiple passages arranged over the tubular body, the restriction of oil flow along the cavity (parallel to the surface of the cylindrical elements) may be minimized. The frequency response may then primarily be defined by the passages through the incompressible tubular body, and a higher cut-off frequency may be achieved. In an embodiment of the invention, the number of passages in the plurality of passages is in a range of 6-20. Increasing the number of passages results in a lowering of the flow resistance of the fluid, e.g. oil. However, this also shifts the frequency response of the filter. To counter this effect, each passage may be made smaller in cross-sectional area, eventually resulting in difficulties in manufacturing of small passages or in reliability challenges. Thus, the number of passages may require a trade-off between resistance of the fluid flow and manufacturing considerations. The inventor has found that numbers in the above-mentioned ranges are suitable.

In an embodiment of the invention, the outer and inner cavities may have variable thicknesses along a central axis thereof, or around the radial periphery. In this way, the combined frequency response of the hydrophone may be tailored by combining different frequency response components from both passages and cavities. The flow along the cavities may have a limiting impact on the achievable filter characteristics at high frequencies.

In an embodiment of the invention, the outer and inner cavities have constant thicknesses. In this way, manufacturing of the tubular body and the deflectable outer wall may be simplified.

In an embodiment of the invention, the outer cavity has a thickness in the range of 0.3-2 mm. Increasing the thickness of the outer cavity may lower the flow resistance of the fluid, but also reduces the suppression capability of the filter.

The thickness of the inner cavity may vary in accordance to the specific design requirements of the hydrophone.

In an embodiment of the invention, the outer cavity has a conical shape towards each passage to reduce the flow resistance in this area.

In an embodiment of the invention, the hydrophone further comprises a flexible bladder for static pressure compensation in the outer cavity and the inner cavity, the flexible bladder being filled with fluid, e.g. oil, and in fluid communication with the inner cavity or the outer cavity via a tubular duct through the first and/or the second lid, the tubular duct having a length and cross-sectional dimension, such that the length of the tubular duct is significantly longer and/or the cross-sectional dimension of the duct is significantly smaller than a length or cross-sectional dimension, respectively, of the passage(s) in the incompressible tubular body. In this way, this tubular duct is configured to generate a high flow restriction even at low frequencies (sub-Hertz), so as to allow static pressure (DC) compensation, with only minimal influence on the frequency response of the hydrophone at acoustic frequencies. Thus, the tubular duct provides a low-pass filter function to allow for compensation of static variations due to temperature and hydrostatic pressure. The tubular duct is configured to allow for pressure changes with a frequency less than a cut-off frequency. Such static pressure compensation, provided by the tubular duct allows the deflectable outer wall to be thin, to reduce or eliminate static pressure difference, and thereby increase the sensitivity of the hydrophone.

In one embodiment, the tubular duct is dimensioned to provide a cutoff frequency in the order of 0.1 Hz.

In an embodiment, the tubular duct is dimensioned to provide a cutoff frequency below about 1/10 of a desired lowest frequency response measurable by the hydrophone.

In an embodiment of the invention, this tubular duct can be made as an integrated duct in the end lid.

In an embodiment of the invention, the hydrophone further comprises a deflectable inner cylinder wall, arranged within the tubular body at a distance thereof, an outer surface of the inner cylinder wall defining an inner boundary of the inner cavity, the inner cylinder wall defining an axis that is arranged to substantially coincide with the axis of the tubular body. The hydrophone further comprises a central cavity defined by an inner surface of the inner cylinder wall, the first end lid, and the second end lid, the central cavity comprising a compressible material, such as a fluid, wherein the first and the second end lid are arranged to seal the inner cylinder wall at a first end and a second end thereof, respectively.

In an embodiment of the invention, the compressible material filled in the central cavity is a gas. In this way, the compressibility of the inner cavity, inner cylinder wall, and central cavity may be increased, resulting in an improved sensitivity of the hydrophone.

In an embodiment of the invention, the tubular body is made from a metal, such as steel.

In an embodiment of the invention, the deflectable outer wall and/or the inner cylinder wall are made from a polymer, such as polycarbonate.

In an embodiment of the invention, the cut-off frequency is chosen to be below 4 kHz, such as 3 kHz, or 2 kHz.

In an embodiment of the invention, the hydrophone further comprises a protective jacket that is arranged to surround the deflectable outer wall and the fibre coil.

In an embodiment of the invention, the protective jacket comprises a polymer material, such as polyurethane, PU.

Herein the term "coincide" when referred to the respective axes of elements such as e.g. the tubular and/or the deflectable outer wall is to be understood to refer to a situation in which two bodies have an axis which is common to both. In other words, the two bodies are "coaxial".

All embodiments described herein are to be considered as example embodiments.

In an example embodiment the outer cavity has a height defined by the distance between the inner surface of the deflectable outer wall and an outer surface of the tubular body, wherein said height of the outer cavity is variable.

In an example embodiment by changing the shape of the outer surface of the incompressible tubular body, and/or the shape of the inner surface of the deflectable outer wall the cut-off frequency of the filter may be changed.

BRIEF DESCRIPTION OF THE FIGURES

The fibre-optic hydrophone according to the invention will now be described in more detail with regard to the accompanying figures. The figures show examples of implementing the present invention and are not to be construed as being limiting to other possible embodiments falling within the scope of the attached claim set.

DETAILED DESCRIPTION OF ILLUSTRATIVE EMBODIMENTS

As mentioned above, it is desired to provide a compact hydrophone with high sensitivity. A highly sensitive hydrophone however typically also exhibits high sensitivity to noise contribution. Thus, the present disclosure also enables an efficient acoustic noise filtering which is provided directly inside the hydrophone, so as to lower the dynamic range needed for reliable interrogation as well as maintaining compact the resulting overall structure.

Particularly, the present disclosure enables realizing hydrophones with a low-pass characteristic with high frequency cut-off which may be made compact, the latter being a significant advantage for enabling the whole sensor system comprising the hydrophone to be made compact. Furthermore, the relatively simple structure of the hydrophone allows for an efficient manufacturing process.

Figure 2:
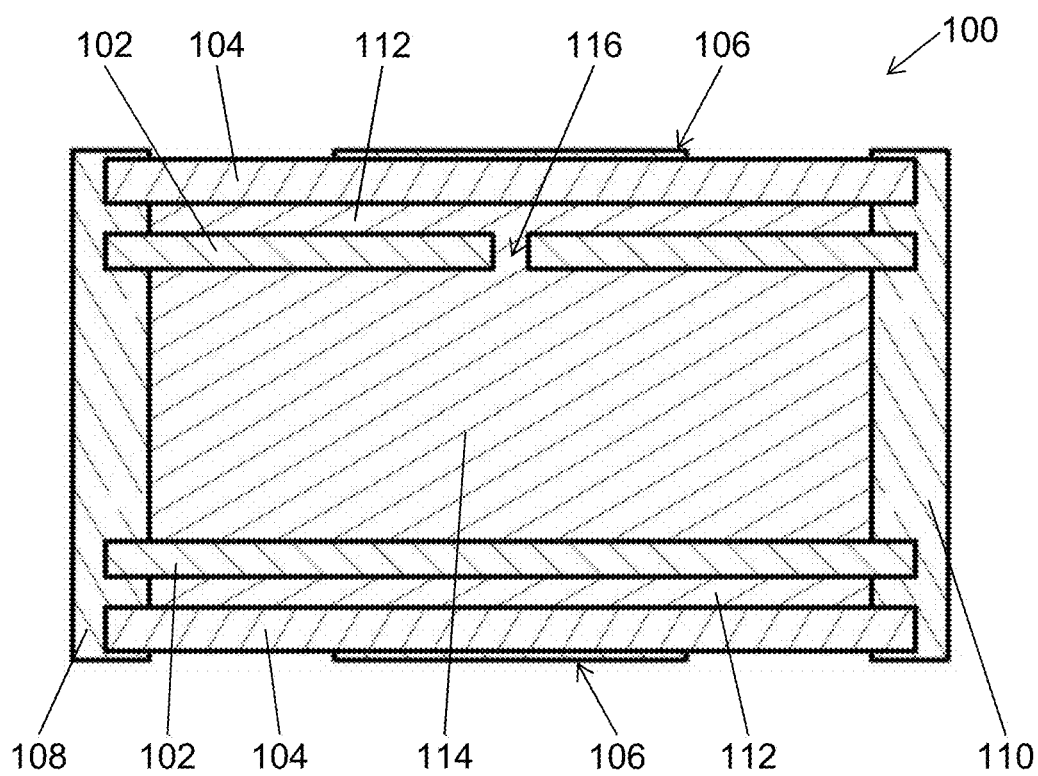
FIG. 2 illustrates a cross-section of a hydrophone according to some embodiments.

FIG. 2 shows an example of a hydrophone 100 according to an embodiment of the invention. The hydrophone 100 comprises a tubular body 102 that is substantially incompressible and inflexible under influence of acoustic signals from the surroundings. The tubular body 102 may for instance be made from or comprise steel.

As used herein the term "incompressible" when referred to part or elements of the hydrophone proposed herein is to be understood to refer a level of resistance to compression that does not exhibit a noticeable change of shape when subjected to the acoustic signal pressures that are typically available on the seabed.

Surrounding the tubular body 102, is arranged a deflectable outer wall 104 for carrying the optical fibre coil 106. In the examples provided in this disclosure the deflectable outer wall has a cylindrical shape. However, this is only exemplary and other shapes such as for example prismatic polyhedrons may also be used for the outer wall.

Figure 1:
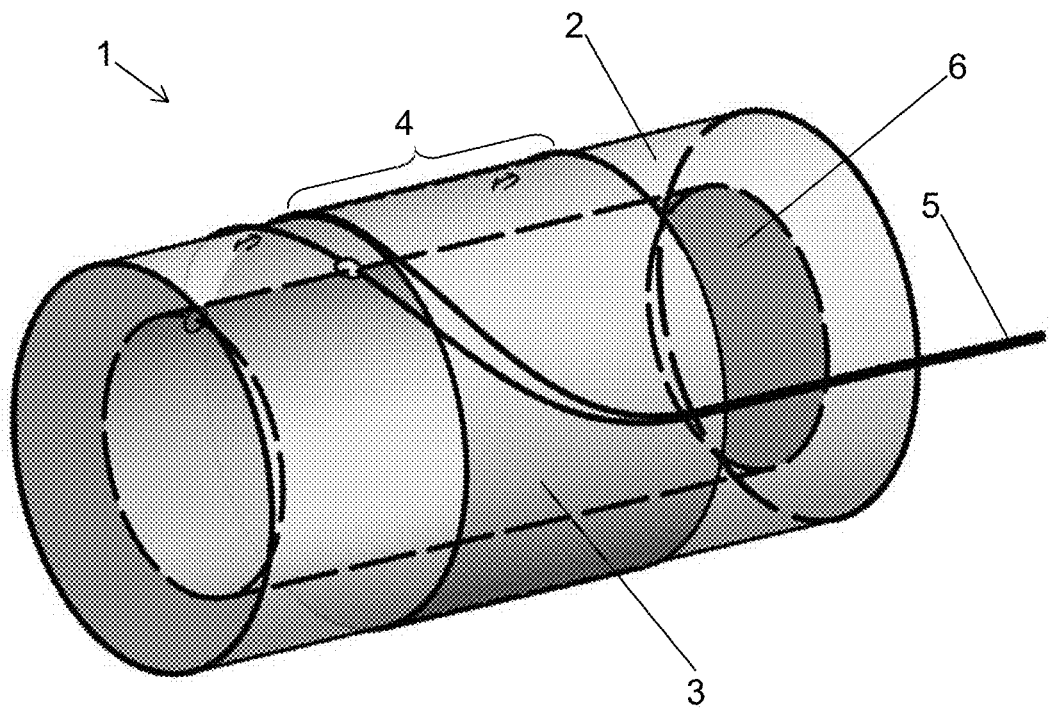
FIG. 1 is a schematic illustration of a fibre-optic air-backed mandrel hydrophone sensing element.

The deflectable outer wall 104 corresponds to the mandrel 2 in the schematic of FIG. 1, and may for instance be made from or comprise polycarbonate or another suitable polymer. The tubular body 102 and the deflectable outer wall 104 are sealed at each end with a first lid 108 and a second lid 110. The first lid 108 and second lid 110 may be significantly stiffer than the deflectable cylinders. In this way, an outer cavity 112 is formed between the deflectable outer wall 104 and the tubular body 102, and an inner cavity 114 is formed inside the tubular body 102. The outer cavity 112 is in fluid communication with the inner cavity 114 via one or more passages 116 (one shown in the figure). The cavities are filled with a fluid. In this and the following example embodiments the fluid is oil. However, the disclosure is not so limited and other fluids may also be used for the purposes of the present disclosure.

We note that the first lid 108 and second lid 110 may take other shapes, such as, for instance, a generally semi-spherical shape. Such a curved shape may be advantageous from a manufacturing view point, and may withstand hydrostatic pressures at large water depths.

At low acoustic frequencies the oil flow through the passage(s) and the deflection of the fibre coil are partly influenced by the compressibility of the oil in the inner cavity 114. At high frequencies, the oil flow may be restricted by the passages (e.g. their shape, dimensions, etc.) in the tubular body 102, and to a lesser extent by the compressibility of the oil in the inner cavity. Thus, the sensitivity may decrease at higher frequencies. By carefully dimensioning the passages 116 in the tubular body 102, they may be configured to function as a filter defining a frequency response, with a low-pass characteristic. Specifically, the cross-sectional shape and length, the number and distribution of the passages can be chosen to provide a frequency dependent transmission with a cut-off for higher acoustic frequencies. Each passage can be dimensioned to act as a mechanical, acoustic low-pass filter in the form of a Helmholtz tube or filter. The characteristics of passages, the cavities as well as the fluid may contribute to an effect which causes their collective contribution to act as a low-pass filter and to have an acoustic cut-off frequency above the acoustic frequency range of interest, such as above 2 kHz.

Assuming circular passages, the 3 dB cut-off frequency of the mechanical low pass filter is approximately:

$$f_c = \frac{N}{2\pi RC},$$

where N is the number of passages connecting the outer and inner cavities, R is the flow resistance through one passage, and C is the compressibility of the liquid (increasing with volume). Provided that the passage is dimensioned so that $L_{passage} \gg R_{passage}$, where $R_{passage}$ is the radius and $L_{passage}$ is the length of the passage, the flow resistance can be expressed as:

$$R = \frac{8dvL_{passage}}{\pi R_{passage}^4},$$

where d and v are the density and viscosity of the liquid (e.g. silicone oil with d=970 kg/m$^3$, v=1.5·10$^{-3}$ m$^2$/s at 5° C.). For example, with N=10, C=2.2 µL/bar, $L_{passage}$=5 mm and $R_{passage}$=0.85 mm, one gets a cut-off frequency $f_c$=2.0 kHz. We note that this example is only one possibility, since the passage does not need to have a circular cross-section, as assumed here.

Preferably, the hydrophone 100 involves one or more passages arranged radially through the tubular body 102, between the outer cavity 112 and the inner cavity 114.

The dimensions and shapes of the outer and inner cavities also have an impact on the overall frequency response of the hydrophone, as they contribute to the fluids overall flow resistance. Important parameters for the frequency response are also the viscosity and compressibility of the fluid. These usually change with temperature and pressure. Some of these parameters and their effects have been discussed further below. The overall design and optimisation of the hydrophone may therefore require the determination of such additional parameters.

Figure 3:
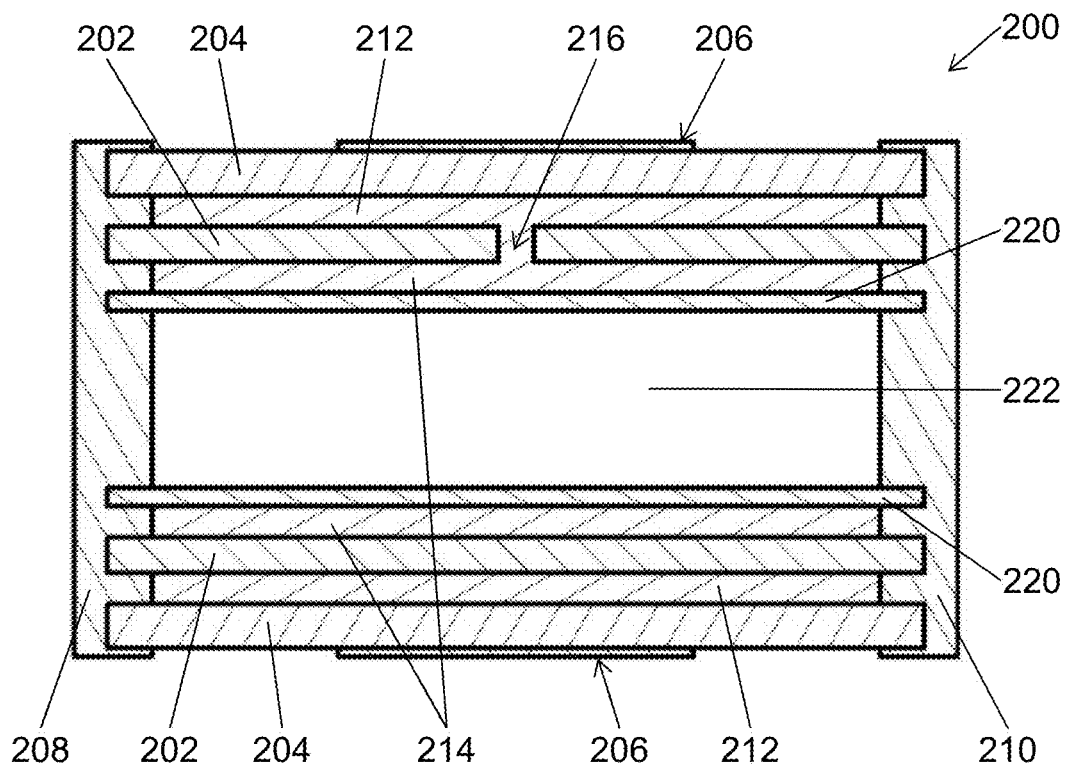
FIG. 3 illustrates a cross-section a hydrophone according to some embodiments.

FIG. 3 illustrates a hydrophone 200 according to another embodiment of the invention. This embodiment corresponds in many aspects to the one shown in FIG. 2, where similar reference numerals refer to similar or like elements. Therefore, only the differences between the two embodiments are discussed here. In this embodiment, a deflectable inner cylinder wall 220 is introduced within the tubular body 202. The deflectable inner wall 220 is also sealed off by the first lid 208 and second lid 210, to define a hermetically sealed central cavity 222. The central cavity comprises a compressible material, such as air or another gas. Surrounding the deflectable inner wall 220 is the inner cavity 214, analogously to the case in FIG. 2. Introducing the deflectable inner wall 220 and the central cavity 222 comprising a compressible material increases the compressibility within the tubular body 202, thereby increasing the sensitivity of the hydrophone 200. Similarly, to the deflectable outer wall 204, the deflectable inner wall 220 may be made from or comprise polycarbonate or another suitable polymer.

Figure 4:
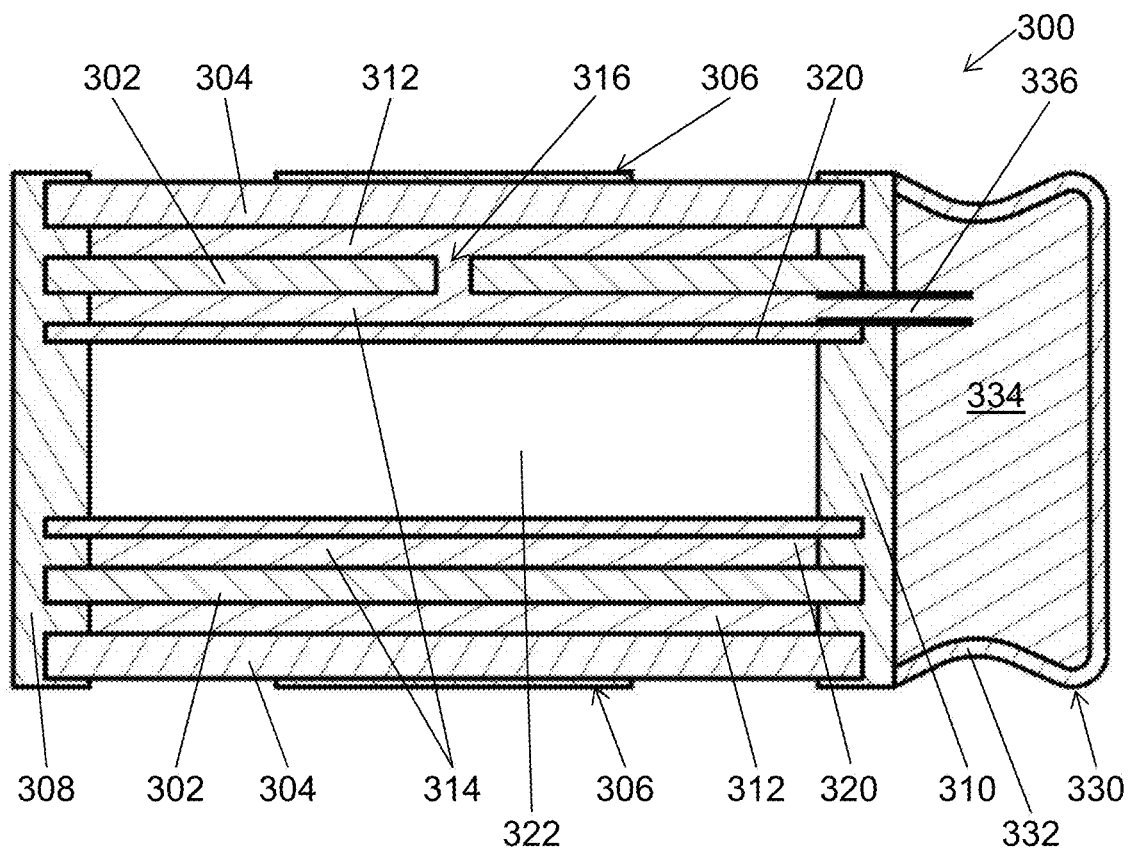
FIG. 4 illustrates a cross-section of a hydrophone according to some embodiments.

FIG. 4 illustrates a hydrophone 300 according to a further embodiment the invention. This embodiment corresponds in many aspects to the ones shown in FIGS. 2 and 3, where similar reference numerals refer to similar or like elements. Therefore, only the differences over the previously mentioned embodiments are discussed here. The hydrophone 300 shown here is compensated with regards to static variations, e.g. due to temperature or hydrostatic pressure, in that a bladder 330 is included to deliver and take up oil due to the static variations. The flexible bladder 330 comprises a flexible membrane 332 and a void 334 surrounded by the flexible membrane 332. The void 334 is filled with preferably the same oil as the oil used inside the hydrophone and is in liquid communication with the inner cavity 314 and the outer cavity 312 via a tubular duct 336. The tubular duct 336 is configured to provide a very low frequency, or near to DC, filter characteristic. The tubular duct 336 may be long and narrow, as compared to the one or more passages 316 of the tubular body 302. When dimensioning the tubular duct 336, the same equations, as described above for the passages, may be used as, but with a desired cut-off at a much lower frequency than for the passage(s). For instance, the cut-off frequency of the tubular duct 336 may be chosen to be below 1/10 of a lowest frequency of interest for detection by the hydrophone. Example: A hydrophone system is designed to detect acoustic signals with a frequency above 5 Hz, and the cut-off frequency of the tubular duct is then chosen to be about 0.1 Hz.

The inventor also envisions an embodiment of a hydrophone, similar to that shown in FIG. 2, i.e. without the central cavity, but with a bladder for compensation, as described here.

In some example embodiments the outer cavity has a height defined by the distance between the inner surface of the deflectable outer wall and an outer surface of the tubular body. Such height of the outer cavity may be variable.

Figure 5:
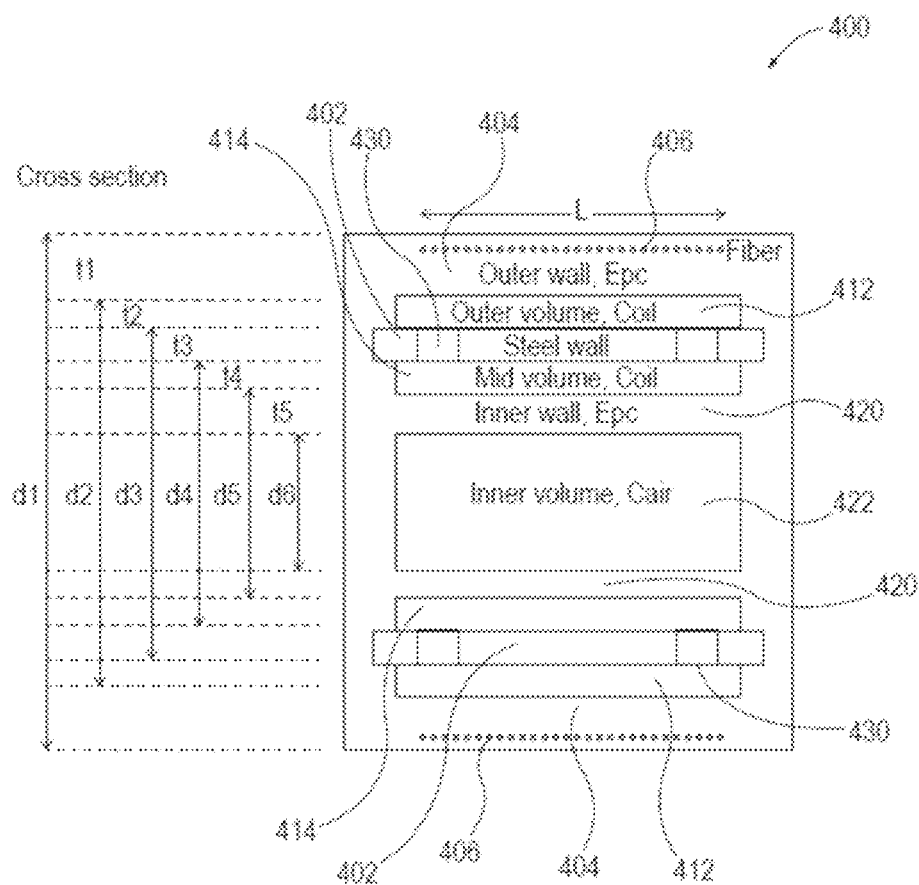
FIG. 5 illustrates a cross-section of a hydrophone according some embodiments.

Filter Simulation—Example:

The inventor has derived a model for pressure transmission in the hydrophone with internal filter according to the invention, based on an internal steel cylinder with passages (holes). The hydrophone sensitivity can also be derived from the model. FIG. 5 schematically illustrates a cross-section of the hydrophone 400, corresponding to the three embodiments discussed above and in detail simulate FIG. 3.

The left-hand side of the figure shows the dimension parameters for diameter d and thickness t used in the model. Six (6) cylinder surfaces are defined represented with diameters labeled $d_1$ through $d_6$. The thicknesses of the corresponding layers are labeled $t_1$ through $t_5$, so that $t_n=0.5(d_{n+1}-d_n)$.

The whole structure is backed with an inner air volume, corresponding to the central cavity 422. The outer 412 and inner 414 cavities between the inner 420 and outer 404 deflectable walls are filled with a fluid, which in this example is oil. The outer 412 and inner 414 cavities are divided by a steel wall, which constitutes the tubular body 402, with multiple radial passages 430 disposed thereupon. The acoustic low-pass filter effect discussed above arises from the flow restriction through these passages and along the cavities (as mentioned above other parameters may also contribute to this filtering effect).

The fibre coil 406 resides close to the outer surface. In some example embodiments the fibre coil may be coiled over the outer surface as shown in FIGS. 2, 3 and 4.

The fibre strain equals the strain in the outer wall 404, which depends on the difference $P-P_{out}$ between the external pressure and the pressure in the outer cavity 412 oil volume.

For the sake of this model, the deflectable inner 420 and outer 404 walls are taken to be made from polycarbonate, and the tubular body 402 is taken to be made from steel. Further, the specific compressibility (inverse bulk modulus) of polycarbonate and steel are assumed to be negligible compared to the oil compressibility.

As mentioned above, in addition to the number of passages (430 in FIG. 5), there are other parameters which can contribute to the filtering response of the hydrophone. Some of these parameters based on non-limiting simulations and experiments made by the inventor, are discussed below:

Viscosity: fluids such as oils are available with a wide range of viscosities. Typically the viscosity depends and changes with temperature. For the purpose of the present disclosure, and without limitation, viscosities may be in a range between 100 and 2000 cSt at temperatures in the range of −5 to 40° C.

Wall compressibilities: The compressibility of a wall (e.g. walls 404, 402 and 420 in FIG. 5) may vary as a function of its respective outer diameter di, thickness ti and length (multiplied by Young's elastic modulus of the layer material).

Volume compressibilities: The compressibility of a cylinder volume (enclosing the outer, center and inner cavities) may vary as a function of its respective outer diameter di and inner diameter di+1 and the specific compressibility, or inverse bulk modulus, of the filling medium, e.g. oil or air.

The inventor has derived a model for pressure transmission in the proposed hydrophone with an internal filter as described herein, based on an internal steel cylinder with passages. The hydrophone sensitivity can also be derived from the model. FIG. 5 schematically illustrates a cross-section of the hydrophone 400, primarily corresponding to the model in FIG. 3.

Figure 6:
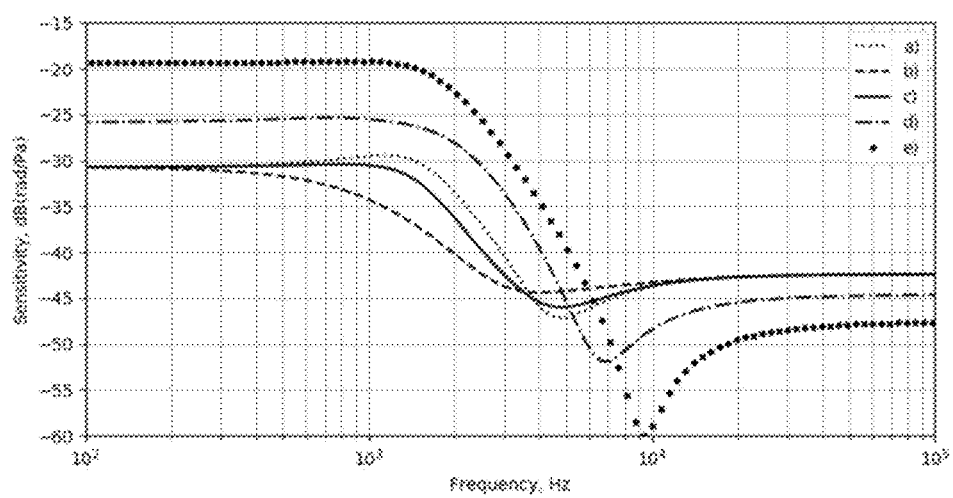
FIG. 6 shows simulated frequency response results for hydrophone models according to various examples.

Five non-limiting simulation examples carried out on a model schematically similar to the one shown in FIG. 5 can be seen in FIG. 6, noted a) to e). The outer diameter of the hydrophone is the same in all simulations. The reference numerals relate to FIG. 5.

The effects of viscosity changes are illustrated by lines a), b) and c). Example a) relates to the lowest and example b) to the highest viscosity. The filter cut-off frequency drops with increasing viscosity as expected from the formula for flow resistance shown above. The simulation results were found to be in reasonable agreement with experimental results testing a prototype hydrophone similar to the one schematically shown in FIG. 3 (and FIG. 5). The viscosity of the fluid was modified by adjusting the test temperature.

The simulated high frequency suppression in a), b) and c) is about 12 dB. The suppression can be increased by increasing the low frequency sensitivity as can be seen in line d). In this simulation the diameter of the inner volume 422 (filled with air) has been increased by making the outer 412 and inner 414 cavities thinner. The wall thickness of the incompressible cylinder 402 ((steel) has been slightly reduced as well. The low frequency sensitivity is mainly determined by the diameter and thickness of the inner polycarbonate layer 420.

The sensitivity at high frequencies has been slightly reduced in line d) due to the thinner outer cavity 412 having reduced compressibility.

Higher sensitivity and suppression can be achieved by reducing the thickness of the outer wall 404, as well as the outer 412 and inner 414 cavities even more. The resulting simulated response can be seen as shown in line e) in FIG. 6. The thickness of the incompressible layer 402 has been slightly increased to achieve even lower sensitivity at high frequencies. The simulated sensitivity has now increased by more than 10 dB compared to the examples shown in lines a), b) and c) and the suppression has been increased by more than 15 dB.

A similar high sensitivity can also be achieved by removing the inner cylinder 420 and filling the interior of the incompressible cylinder 402 with fluid 414. Such a design is similar to the example shown in FIG. 2.

The simulation model/program has been used to optimize the number of filter passages, their diameter and location, as well as the viscosity of the fluid, to provide a desirable "critically damped" transition with 3 dB cut-off frequency fixed at 2 kHz for lines d) and e).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A fibre-optic hydrophone comprising:
   a tubular body generally having a geometry of a cylindrical shell defining an axis, wherein the tubular body is substantially incompressible;
   a deflectable outer wall, arranged to surround the tubular body at a distance thereof, and defining an axis that is arranged to substantially coincide with the axis of the tubular body;
   an optical fibre coil arranged on an outer surface of the deflectable outer wall; and
   a first end lid and a second end lid arranged to seal the tubular body and the deflectable outer wall at a first end and a second end thereof, respectively, the first end lid and the second end lid being substantially incompressible;
   wherein an outer cavity is defined by an inner surface of the deflectable outer wall, an outer surface of the tubular body, the first end lid, and the second end lid;
   wherein an inner cavity is defined by an inner surface of the tubular body, the first end lid, and the second end lid;
   wherein the outer cavity is in fluid communication with the inner cavity via one or more passages in the tubular body, the outer cavity and the inner cavity being filled with fluid, wherein the one or more passages are configured to cause a flow resistance of the fluid between the cavities such that the one or more passages function as an acoustic low pass filter having a cut-off frequency.

2. The fibre-optic hydrophone of claim 1, wherein the outer cavity has a height defined by the distance between an inner surface of the deflectable outer wall and the outer surface of the tubular body, wherein the height of the outer cavity is variable.

3. The fibre-optic hydrophone of claim 1, wherein the one or more passages have substantially identical cross-sectional shapes.

4. The fibre-optic hydrophone of claim 1, wherein at least one of the one or more passages has a different cross-sectional shape as compared to at least one other of the one or more passages.

5. The fibre-optic hydrophone of claim 1, wherein the one or more passages include a plurality of passages substantially uniformly positioned around the tubular body.

6. The fibre-optic hydrophone of claim 1, wherein the outer cavity has a conical shape towards each of the one or more passages.

7. The fibre-optic hydrophone of claim 1, wherein a number of passages in the one or more passages is in a range of 6-20.

8. The fibre-optic hydrophone of claim 1, wherein the tubular body is made from a metal.

9. The fibre-optic hydrophone of claim 1, wherein the deflectable outer wall has a cylindrical shape.

10. The fibre-optic hydrophone of claim 1, wherein the deflectable outer wall is made from a polymer.

11. The fibre-optic hydrophone of claim 10, wherein the polymer comprises polycarbonate.

12. The fibre-optic hydrophone of claim 1, wherein a cut-off frequency of the acoustic low pass filter is in a range between 2 kHz and 10 kHz.

13. The fibre-optic hydrophone of claim 1, further comprising:
   a flexible bladder for static pressure compensation in the outer cavity and the inner cavity, the flexible bladder being filled with fluid, and in fluid communication with the inner cavity or the outer cavity via a tubular duct through at least one of the first end lid or the second end lid, the tubular duct having a length and cross-sectional dimension, wherein at least one of the length of the tubular duct is significantly longer or the cross-sectional dimension significantly smaller than a length or cross-sectional dimension, respectively, of the one or more passages in the tubular body.

14. The fibre-optic hydrophone of claim 13, wherein the tubular duct is dimensioned to provide a cut-off frequency in the order of 0.1 Hz.

15. The fibre-optic hydrophone of claim 13, wherein the tubular duct is dimensioned to provide a cut-off frequency below about 1/10th of a desired lowest frequency response measurable by the fibre-optic hydrophone.

16. The fibre-optic hydrophone of claim 1, further comprising:
- a deflectable inner cylinder wall, arranged within the tubular body at a distance thereof, an outer surface of the deflectable inner cylinder wall defining an inner boundary of the inner cavity, the deflectable inner cylinder wall defining an axis that is arranged to substantially coincide with the axis of the tubular body, such that a central cavity is defined by an inner surface of the deflectable inner cylinder wall, the first end lid, and the second end lid, the central cavity comprising a compressible material;
- wherein the first end lid and the second end lid are arranged to seal the deflectable inner cylinder wall at a first end and a second end thereof, respectively.

17. The fibre-optic hydrophone of claim 16, wherein the compressible material filled in the central cavity is a gas.

18. The fibre-optic hydrophone of claim 16, wherein at least one of the deflectable outer wall and the deflectable inner cylinder wall is made from a polymer.

19. The fibre-optic hydrophone of claim 1, further comprising:
- a protective jacket that is arranged to surround the deflectable outer wall and the optical fibre coil.

20. The fibre-optic hydrophone of claim 19, wherein the protective jacket includes a polymer material.

21. The fibre-optic hydrophone of claim 1, wherein the cut-off frequency is below 4 kHz.

\* \* \* \* \*